Jan. 4, 1966    R. K. WEBSTER    3,227,316
APPARATUS FOR CONTINUOUSLY FORMULATING MULTI-COMPONENT MIXTURES
Filed Oct. 26, 1964
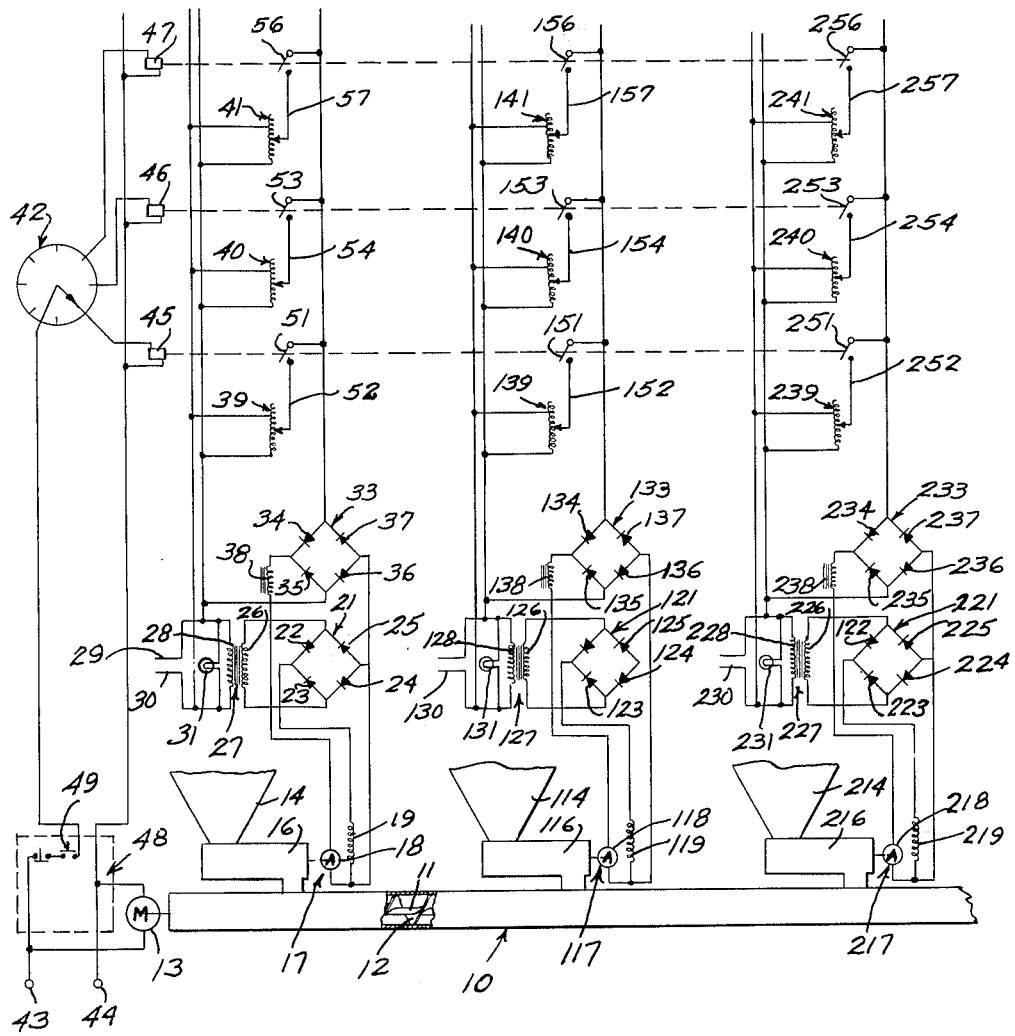
INVENTOR.
Ralph K. Webster
BY
ATTORNEYS United States Patent Office 3,227,316
Patented Jan. 4, 1966

3,227,316
APPARATUS FOR CONTINUOUSLY FORMULATING MULTI-COMPONENT MIXTURES
Ralph K. Webster, Andover, Mass., assignor to H. K. Webster Company, Lawrence, Mass., a corporation of Massachusetts
Filed Oct. 26, 1964, Ser. No. 406,401
8 Claims. (Cl. 222—76)

The present invention relates to a system for continuously compounding multi-component mixtures, either dry or liquid, or combinations of the two.

While continuous mixing systems are not new, there has always been a problem in changing from one formulation to another with such systems. For example, let us assume that the system is to be used to produce three mixtures of three ingredients, A, B and C. Mixture No. 1 might have 80% A, and 10% B, and 10% C. Mixture No. 2 might be 20% A, 30% B and 50% C, while mixture No. 3 could be 30% A, 30% B, and 40% C. When it is desired to change the production from mixture No. 1 to mixture No. 2, the entire system is shut down, and the rate of feed of each of the feeders is adjusted to produce the new formulation. For example, in the example given, the motor driving the dispenser for component A would be run at a speed of ¼ what it had been previously, while the motors driving the dispensers for components B and C would be run at 3 and 5 times their former speeds, respectively. This interruption in the mixing operation may represent a significant loss in time and labor since a certain amount of skill is required to make the change-overs from one formulation to another.

In accordance with the present invention, I provide a system for continuously dispensing components or a multi-component mixture at predetermined rates, with the change-over from one formulation to another formulation being done simply by changing the setting of a selector switch. The system of the present invention permits any number of predetermined outputs of feeders to be manually preset in advance, and any one of these outputs, together with related outputs of other feeders may be selected in accordance with any number of established formulae without requiring any further manual adjustment of the feeders. The presetting of the feeding means in accordance with specific formulas, and the use of a single selector switch to select between the formulas eliminates possible human errors in making adjustments, and permits unskilled labor to produce consistently accurate formulations without previous training or experience.

In accordance with the present invention, I provide a dispensing system for multi-component mixtures having predetermined ratios of ingredients, including a combined collecting and conveying means which is fed by a plurality of individual feed means each discharging one of the ingredients at a predetermined rate into the collecting and conveying means. A separate motor drives each of the feed means, and a series of manually adjustable speed control means is selectively connectable to each of the motors to thereby cause the motor to drive the feed means at a speed predetermined to achieve the required discharge rate. A single switch means is connected in the circuits to introduce selectively one of the speed control means into the control circuit for each of the motors, so that operation of the switch causes each of the feed means to be energized in accordance with a predetermined presetting on the speed control means and thereby deliver the proper amount of each of the ingredients in accordance with the formula being compounded.

A further description of the present invention will be made in conjunction with the attached sheet of drawings which illustrates a preferred embodiment thereof.

The single figure of the drawings illustrates rather schematically a complete system for blending three dry components in three separate formulae. It should be understood however, that the invention is equally applicable to the blending of liquid ingredients with suitable changes in feeding and mixing means, and also that the invention may be applied to any number of components in any number of formulae.

In the system shown, reference numeral 10 indicates generally a continuous collector and mixer into which the various feeding devices discharge, the mixer 10 including a shaft 11 carrying helical conveyor flights 12 and driven by an A.C. motor 13. Component A of the three component mixture used for purposes of illustration is continuously supplied by means of a hopper 14 which discharges into a feeder 16 driven by a motor generally indicated at numeral 17. The motor 17 is preferably a D.C. motor having an armature winding 18 and a field winding 19. I prefer to use a D.C. motor drive for the feeder because operation of such systems is more stable than with A.C. motors.

The field winding 19 is supplied with a constant D.C. potential from a conventional rectifier circuit 21 containing conventional rectifier elements such as copper oxide rectifiers 22, 23, 24 and 25 connected to provide full wave rectification of an alternating current voltage. The latter is supplied by the secondary 26 of a transformer 27 whose primary 28 is energized from a suitable alternating current source (not shown) by means of conductors 29 and 30. An indicating lamp 31 is placed across the source to show that an energizing voltage is being applied across the transformer 27.

The armature 18 of the D.C. motor 17 is energized selectively with a predetermined D.C. potential which varies depending upon the amount of component A to be introduced into the mixture being formulated. The energization of the armature 18 is controlled by another rectifier circuit 33 consisting of individual rectifier elements 34, 35, 36 and 37 connected to provide full wave rectification of the A.C. source. A choke 38 is included in the output of the full wave rectifier to smooth out voltage variations. The rectifier circuit 33 is energized from the alternating current source through one of a plurality of adjustable transformers 39, 40 or 41 each of which is connected across the alternating current source. Each of the adjustable transformers 39, 40 and 41 is preset such that when each of the transformers is in circuit with the rectifier unit 33, the resulting armature voltage on the motor 17 will be such as to cause operation of the motor 17 at the appropriate speed for the particular formulae involved. To go back to the specific example previously given, if formula No. 1 is to be an 80–10–10 mixture of components A, B and C, and formula No. 2 is to be a 20–30–50 mixture, then the setting on transformer 39 will be such as to provide a discharge rate at the feeder 16 which will be four times as high when transformer 39 is in the circuit as it is when transformer 40 is in the circuit.

The various transformers are selectively introduced into the circuit of the feeder means by operation of a selector switch 42 which has as many positions on the switch as there are formulae to be compounded. The selector switch 42 selectively applies the alternating current potential appearing across a pair of terminals 43 and 44 to one of a series of relay coils 45, 46 and 47. The same A.C. voltage source is used to energize a magnetic starter 48 which drives the motor 13. The starter 48 includes a start switch 49 and a suitable holding relay (not shown) to maintain the motor 13 energized.

In the specific position of the switch 42 shown in the drawing, the alternating current voltage is applied across the relay coil 45 which closes an associated relay contact 51 to apply the preselected voltage appearing at the variable arm 52 of the adjustable transformer 39 across the rectifier unit 33. When the selector switch 42 is rotated one step counterclockwise, it applies the energizing voltage across the relay 46, whereupon an associated relay contact 53 closes, and the preset voltage appearing at the adjustable arm 54 of the transformer 40 is applied across the rectifier circuit 33. Similarly, when the selector switch 42 is moved to its next position in the counterclockwise direction, the resulting energization of the relay coil 47 closes a contact 55 and thereby applies the preselected voltage appearing on the variable arm 57 of the transformer 41 across the rectifier circuit 33.

The corresponding circuits for introducing the other ingredients, B and C, of the assumed three component mixture are identical to those just described in connection with feeding component A. The corresponding circuit elements have accordingly been given corresponding numbers, except that the elements for feeding component B have been identified with reference numerals 100 numbers higher than the corresponding elements in the circuit just described, and the elements for feeding component C have reference numerals 200 digits higher than the corresponding elements for feeding component A.

The operation of the complete system should be evident from the preceding discussion. When the selector switch 42 is in the position shown in the drawing, relay 45 is energized and relay contacts 51, 151, and 251 are simultaneously closed. Accordingly, the preselected voltage determined by the setting of the arm 52 is applied to the rectifier unit 33, which in turn provides the appropriate D.C. voltage to the armature winding 18 so that the motor 17 drives the feeder 16 at the speed required for introducing the desired amount of component A into the mixer 10. Similarly, the closing of the relay contact 151 applies the preselected A.C. voltage determined by the setting of the arm 152 across the rectifier unit 133, thereby applying the appropriate armature voltage to the motor 117 to drive the feeder 116 at a rate appropriate for introducing the correct amount of component B into the mixer 10.

Energization of the relay coil 45 also serves to close the relay contact 251 which applies the preselected voltage appearing across transformer 239 across the rectifier 233. The resulting D.C. voltage applied to the armature 218 controls the speed of the motor 217 and the feeder 216 to that required for introducing the requisite amount of component C into the mixture. To change formulae, it is merely necessary to move the arm on the selector switch 42 to the desired position, whereupon the other series of preset transformers (40, 140, 240; 41, 141, 241, etc.) are placed in the circuits to control the motor speeds of feeder motors 17, 117 and 217 and thereby set the rates of feeder discharge.

From the foregoing, it will be understood that the system of the present invention makes it extremely simple to switch a continuous mixing system from one formulation to another, without shutdown of the equipment and without the use of skilled labor.

It should also be evident that various modifications can be made to the described embodiments without departing from the scope of the present invention.

I claim as my invention:

1. A dispensing system for multi-component mixtures having predetermined ratios of ingredients comprising a combined collecting and conveying means, a plurality of individual feed means each discharging one of said ingredients at a predetermined rate into said collecting and conveying means, a separate motor driving each of said feed means, a series of manually adjustable feed control means selectively connectable to each of said motors to thereby cause each of said motors to drive said feed means to achieve said predetermined discharge rate, and a single switch means connected to introduce selectively one of said speed control means into the control circuit of each of said motors.

2. The system of claim 1 in which each of said speed control means includes a variable transformer.

3. A dispensing system for multi-component mixtures of predetermined ratios of ingredients comprising a combined collecting and conveying means, a plurality of individual feed means each discharging one of said ingredients at a predetermined rate into said collecting and conveying means, a separate direct current motor driving each of said feed means, each of the direct current motors having a field winding and an armature winding, means for supplying each of the field windings with a substantially constant D.C. potential, means for supplying each of said armature windings with one of a plurality of D.C. potentials to thereby run its associated motor at a different predetermined speed, and a single switch connected to supply one of said D.C. potentials simultaneously to each of the armature windings of the motors.

4. The system of claim 3 in which the armature potential supply means includes a full wave rectifier and a variable transformer supplying an alternating current potential to said rectifier.

5. A dispensing system for multi-component mixtures of predetermined ratios of ingredients comprising a combined collecting and conveying means, a drive motor driving said collecting and conveying means, a starter circuit for energizing said drive motor, a plurality of individual feed means each discharging one of said ingredients at a predetermined rate into said collecting and conveying means, a separate direct current motor driving each of said feed means, each of the direct current motors having a field winding and an armature winding, means for supplying each of the field windings with a substantially constant D.C. potential, means for supplying each of said armature windings with one of a plurality of D.C. potentials to thereby run its associated motor at different predetermined speeds, a plurality of relay means arranged to apply one of said D.C. potentials across each of the armature windings of the direct current motors, and a single switch means in series with said starter circuit for selectively energizing selected ones of said relay means.

6. In a system for continuously dispensing components of a mixture at predetermined rates in which individual dispensing means discharge into a collecting and conveying means, the improvement which comprises a separate motor driving each of said dispensing means, a plurality of motor energizing means selectively energizing each of said motors to operate said motors at predetermined speeds, and a single switch means connected to selectively energize selected ones of said motor energizing means.

7. The system of claim 6 in which said motors are D.C. motors.

8. The system of claim 6 in which said motors are D.C. motors and each of said energizing means includes a variable transformer.

No references cited.

LOUIS J. DEMBO *Primary Examiner.*